(12) United States Patent
Park et al.

(10) Patent No.: US 6,817,387 B2
(45) Date of Patent: Nov. 16, 2004

(54) WET PROCESSING BATH AND FLUID SUPPLYING SYSTEM FOR LIQUID CRYSTAL DISPLAY MANUFACTURING EQUIPMENT

(75) Inventors: Yong-Seok Park, Seoul (KR); Sang-Ho Kim, Hwasong (KR); Sok-Joo Lee, Yongin (KR)

(73) Assignee: Display Manufacturing Service Co., Ltd., Suwon (KR)

(*) Notice: Subject to any disclaimer, the term of this patent is extended or adjusted under 35 U.S.C. 154(b) by 0 days.

(21) Appl. No.: 10/413,557

(22) Filed: Apr. 15, 2003

(65) Prior Publication Data

US 2003/0196719 A1 Oct. 23, 2003

(30) Foreign Application Priority Data

Apr. 23, 2002 (KR) .............................. 10-2002-0022205
Apr. 25, 2002 (KR) .............................. 10-2002-0022700

(51) Int. Cl.[7] .............................................. B65B 1/20
(52) U.S. Cl. ............................ 141/82; 141/65; 141/69; 141/85

(58) Field of Search .............................. 141/82, 94, 95, 141/100, 65, 69, 70, 83, 85, 110; 118/715, 719; 156/345.11, 345.22, 345.31, 345.32, 345.5, 345.55, 345.21; 414/217.1, 935, 937, 939, 940

(56) References Cited

U.S. PATENT DOCUMENTS 6,461,437 B1 * 10/2002 Kubota et al. .............. 118/719
6,551,488 B1 * 4/2003 Hey et al. ................... 205/157

* cited by examiner

Primary Examiner—Timothy L. Maust
(74) Attorney, Agent, or Firm—Rothwell, Figg, Ernst & Manbeck

(57) ABSTRACT

A fluid supplying system for LCD manufacturing equipment and a wet processing bath therefor are provided. The fluid supplying system includes a bath united with storage tank in which a fluid collection bath is united with a fluid storage tank. The storage tank having a small size is individually provided to each bath. Further, the body of the wet processing bath is made of a durable material with a chemical resistive material coated thereon. Therefore, the wet processing unit can be widely used regardless of the different types of chemical fluid.

12 Claims, 6 Drawing Sheets

WET PROCESSING BATH AND FLUID SUPPLYING SYSTEM FOR LIQUID CRYSTAL DISPLAY MANUFACTURING EQUIPMENT

BACKGROUND OF THE INVENTION

This application claims the priority of Korean Patent Application No. 2002-22205, filed on Apr. 23, 2002, and Korean Patent Application No. 2002-22700, filed on Apr. 25, 2002, in the Korean Intellectual Property Office, the disclosure of which is incorporated herein in its entirety by reference.

1. Field of the Invention

The present invention relates to a fluid supplying system for LCD (liquid crystal display) manufacturing equipment, and more particularly, to a wet processing bath for LCD manufacturing equipment and a fluid supplying system including the wet processing bath.

2. Description of the Related Art

Recently, sizes of LCD panels have been becoming larger and resolutions thereof have been becoming higher. As technical problems concerning, e.g., higher contrast, wider viewing angle, etc., are being solved, conventional CRT (Cathode Ray Tube) devices are rapidly being replaced by LCD devices. Particularly, such a trend is accelerated in relation to the development of active matrix type TFT-LCD (Thin Film Transistor Liquid Crystal Display) devices and wider applications thereof. The active matrix type TFT-LCD is characterized in that switching elements called TFT's are formed in correspondence to each pixel and the pixels are individually controlled.

Generally, glass is used as a substrate material in a process for fabricating transistors formed in correspondence to each pixel of a TFT-LCD device, i.e., a thin film transistor fabrication process. Since the melting point of glass is relatively low, a processing temperature of the thin film transistor fabrication process is limited to the range of 300 to 500° C. Further, in order to embody a circuit on the glass substrate, unit processes of a typical semiconductor fabrication process are applied to the thin film transistor fabrication process. Therefore, lots of wet processes using fluid are adapted to the thin film transistor fabrication process. In the wet processes, such as cleaning, stripping, wet etching, or developing, a fluid such as a chemical solution or deionized water is used.

FIG. 1 is a schematic diagram of a conventional fluid supply system used in manufacturing LCD devices.

Referring to FIG. 1, the fluid supplying system includes a plurality of baths 121, 122, 123 having fluid collection units (not shown), a storage tank 130, a pump 140, a fluid supplement unit 150, and pipelines (not shown) for connecting the foregoing elements. Unit process, e.g., cleaning, etching, or developing, is performed in the baths 121, 122, and 123 and is referred to $1^{st}$, $2^{nd}$, or $3^{rd}$ process unit in FIG. 1. The baths 121, 122, and 123 are connected to the storage tank 130 and the pump 140 via the pipelines.

Although three baths 121, 122, and 123 are shown in FIG. 1, there is no limit in the number of baths connected to the pump 130. While the size of the storage tank 130 and the arrangement of the baths are determined according to the number of the baths 121, 122, and 123 equipped in the system, the baths 121, 122, and 123 are generally arranged in a structure where minimum pipelines are used so that a loss of pressure or heat of the fluid can be minimized.

The fluid is supplied to the process units 111, 112, and 113 included in the baths via the pump 140, and the used fluid is collected in the baths 121, 122, and 123. The fluid drained from the baths 121, 122, and 123 includes by-products of each process, such as contaminants, etching residuals, or developing residuals. The fluid collected in the baths 121, 122, and 123 is recollected and stored in the storage tank 130 via the pipelines. During this process, some of the residual materials can be filtered.

As shown in FIG. 1, since a single storage tank 130 is used in connection with a plurality of baths 121, 122, and 123, the size of the storage tank 130 should be large in that a huge amount of fluid can be stored therein. Typically, the storage tank 130 may include a heater (not shown). The heater adequately raises the temperature of the fluid so that the unit processes can be performed efficiently in the process units 111, 112, and 113.

The fluid stored in the storage tank 130 is supplied again to the process units 111, 112, and 113 in the baths via the pump 140. The pipelines connecting the pump and the baths 121, 122, and 123 include valves (not shown), filters (not shown), and regulators (not shown). Fluid is supplied from the fluid supplement unit 150 in addition to the storage tank 130. Since the fluid is adhered to the substrates and drained together with the substrates outside the baths 121, 122, and 123 during the processes, the fluid supplement unit 150 supplements the drained fluid. The fluid supplement unit 150 may also include a heater (not shown).

FIG. 2 is a more detailed diagram of the conventional fluid supply system that is applied to cleaning equipment, in which only one bath 221 is represented. FIG. 2 simply and schematically shows the structure of a cleaning unit 211 placed in the bath 221, as well as valves 261, filters 262, regulators 263, and flow meters 264 included in pipelines, and may be different from the structure of a cleaning unit and the arrangements of pipelines used in actual cleaning equipment.

Apparent from FIGS. 1 and 2, the conventional fluid supplying system is characterized in that a bath is provided for each process unit and only one storage tank is used for a plurality of baths. Accordingly, the distance between the baths and the storage tank and that between the pump and baths are fairly long. Thus, the temperature and the pressure of fluid can be lowered while passing through the long pipelines.

Due to the thermal loss in the conventional fluid supplying system, additional costs are required in equipping large-capacity pumps to reduce the thermal loss. Further, it is hard to supply fluid at an optimum temperature. In addition, since a great amount of fluid should be supplied to each bath, a pump having a large capacity is required.

Furthermore, long pipelines are required for connecting each element of the conventional fluid supplying system, and the arrangements of the pipelines and the structure of the system are very complex. For example, numerous connecting elements, such as filers, valves, elbows, reducers, T's, etc., should be used and be arranged in a complicated manner. Particularly, in a case where the processing fluid is a highly toxic chemical, such as hydrochloric or nitric acid, the connecting elements used in the pipelines are very expensive, and accordingly, the cost and expenses for manufacturing and maintaining the fluid supplying system are increased.

Moreover, in the conventional fluid supplying system, the amount of fluid supplemented from the fluid supplement unit is very small in comparison to the amount of the fluid used in the process units. If the amount of the processing fluid is great, it is difficult to prevent the gradual increase in the opacity of the fluid even though clean fluid is supplemented from the outside. If the opacity of the fluid increases, the substrates may be contaminated and, thus, the production yield of the LCD devices will be decreased. In order to prevent the contamination of the substrates and the decrease of the production yield, it is required to periodically replace all of the fluid stored in the storage tank with fresh fluid.

Meanwhile, the body of the bath 221 used in the fluid supplying system is generally made of durable materials such as steel, namely, SUS metal or Polyvinyl Chloride (PVC), through welding or coupling since wet processes should be performed to remove organic or inorganic substances, metal ion surface films, corpuscles, or contaminants adhered on the surface of the LCD device.

In order to reduce the process time, the concentration of the chemical fluid used in the wet processes for manufacturing the LCD devices is becoming higher. However, due to the high concentration of the chemical fluid, the surface of the body of the bath 221 is easily damaged.

For example, in a case where the material of the body of bath 221 is steel, namely, as SUS metal, the body of the bath 221 is eroded by a strong acid fluid used in an wet etching process. Thus, the SUS metal is hardly used in the bath for etching process. Further, in a case where the material of the body of bath 221 is PVC, the body of the bath 221 is eroded by an organic solvent used in a stripping process. Since the body of the bath can be melted due to the organic solvent, the use of PVC is also restricted.

That is, the baths used for stripping, cleaning, etching, and developing are not compatible with each other. Further, use of new chemical fluids in the wet processes is restricted because the material of the bath should be firstly considered.

SUMMARY OF THE INVENTION

It is an aspect of the present invention to provide a fluid supplying system for LCD manufacturing equipment, which prevents losses of heat and pressure, operates with a small pump, requires lower manufacturing costs and maintenance expenses, and is small in size.

According to the aspect of the present invention, there is provided a fluid supplying system for LCD manufacturing equipment, which includes a bath united with storage tank including a process unit and a fluid storage tank united with the bath; a fluid supplement unit for supplementing fluid that is adhered to substrates within the process unit and discharged together with the substrates outside of the bath united with storage tank; a pump for supplying fluid stored in the bath united with storage tank and the fluid supplemented from the fluid supplement unit; and a plurality of pipelines for connecting the bath united with storage tank, including the process unit, and the fluid supplement unit to the pump. Here, the LCD manufacturing equipment can be cleaning, etching, developing, or stripping equipment.

Preferably, the bath united with storage tank includes a first heater for heating the fluid and the fluid supplement unit includes a second heater for heating the fluid to be supplemented at a constant temperature. Further, the pipelines for connecting the process unit to the pump include filters, valves, regulators, and flow meters.

It is another aspect of the present invention to provide a wet processing bath for LCD manufacturing equipment, which is not significantly influenced by chemical fluid used in wet processes and which can be compatibly used in stripping, cleaning, etching, and developing equipment.

According to another aspect of the present invention, there is provided a wet processing bath for LCD manufacturing equipment, which includes a bath body; a process unit included in the bath body, in which a predetermined process is performed; and an outlet for draining fluid within the bath body outside of the bath, wherein the bath body is made of a durable material and a chemically resistive material is coated on the surface of the durable material. Here, the LCD manufacturing equipment can be cleaning, etching, developing, or stripping equipment.

Preferably, the chemically resistive material is Teflon and may be coated on one side or both sides of the durable material.

According to still another aspect of the present invention, there is provided a fluid supplying system for LCD manufacturing equipment, which includes a bath united with storage tank including a process unit and a fluid storage tank united with the bath; a fluid supplement unit for supplementing fluid that is adhered to substrates within the process unit and drained together with the substrates outside of the bath united with storage tank; a pump for supplying fluid stored in the bath united with storage tank and the fluid supplemented from the fluid supplement unit; and a plurality of pipelines for connecting the bath united with storage tank, including the process unit, and the fluid supplement unit to the pump, wherein the bath united with storage tank includes a bath body; a process unit included in the bath body, in which a predetermined process is performed; and an outlet for draining fluid within the bath body outside of the bath, and the bath body is made of a durable material and a chemically resistive material coated on the surface of the durable material. Here, the LCD manufacturing equipment can be cleaning, etching, developing, or stripping equipment.

Preferably, the bath united with storage tank includes a first heater for heating the fluid and the fluid supplement unit includes a second heater for heating the fluid to be supplemented at a constant temperature. Further, the pipelines for connecting the process unit to the pump include filters, valves, regulators, and flow meters.

It is also preferable that the chemically resistive material is Teflon and that the chemically resistive material is coated on one side or both sides of the durable material.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Figure 1:
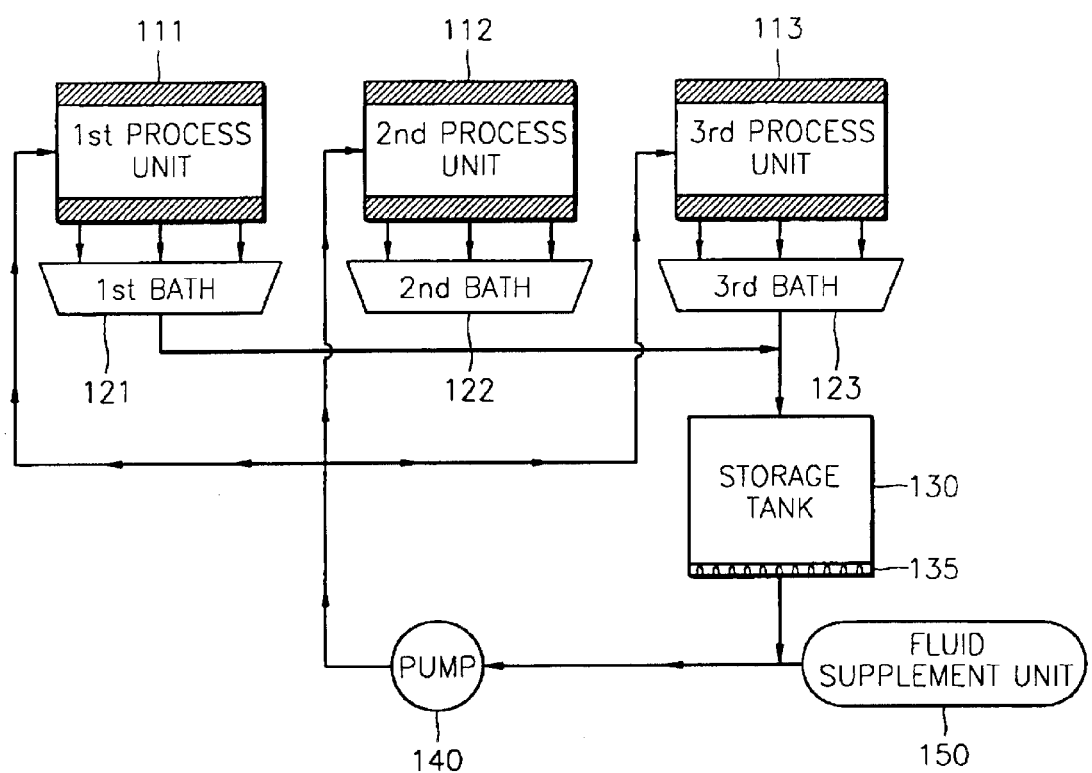
FIG. 1 is a schematic diagram of a convention fluid supplying system for LCD manufacturing equipment.

Hereinafter, the present invention will be described more fully with reference to the accompanied drawings in which preferred embodiments of the invention are shown. This invention may, however, be embodied in many different forms and should not be construed as being limited to the embodiments set forth herein. Rather, these embodiments are provided so that this disclosure will be thorough and complete and will fully convey the scope of the invention to those skilled in the art. In the drawings, the forms of the elements are exaggerated for clarity. To facilitate understanding, identical reference numerals have been used, where possible, to designate identical elements that are common to the figures.

Figure 3:
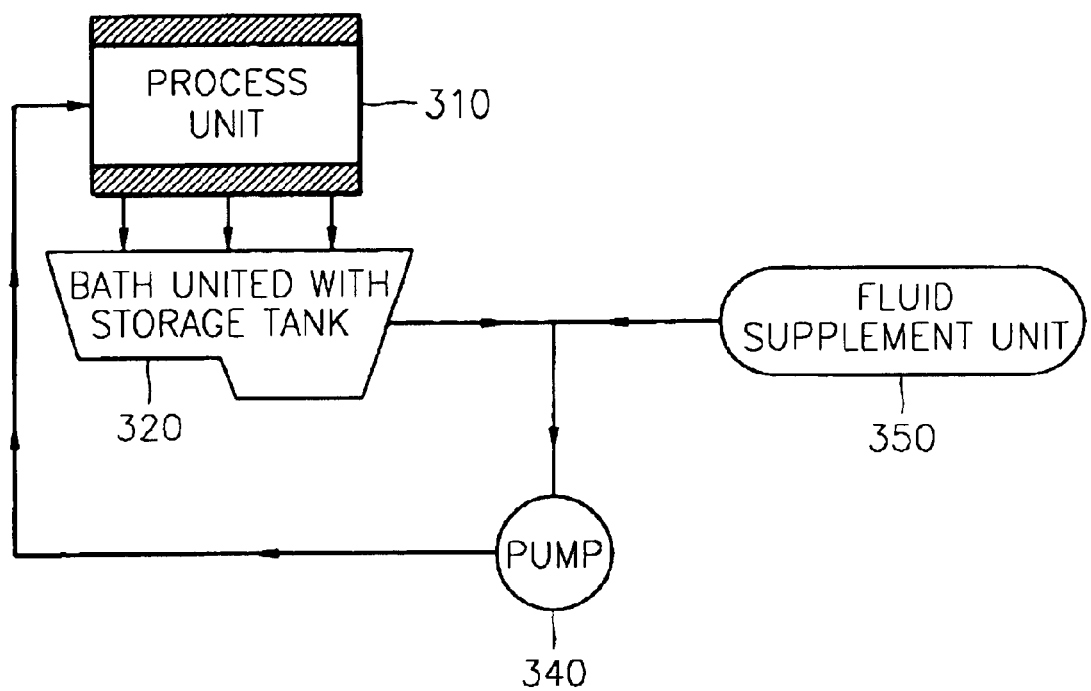
FIG. 3 is a schematic diagram of a fluid supplying system according to the present invention.
Figure 4:
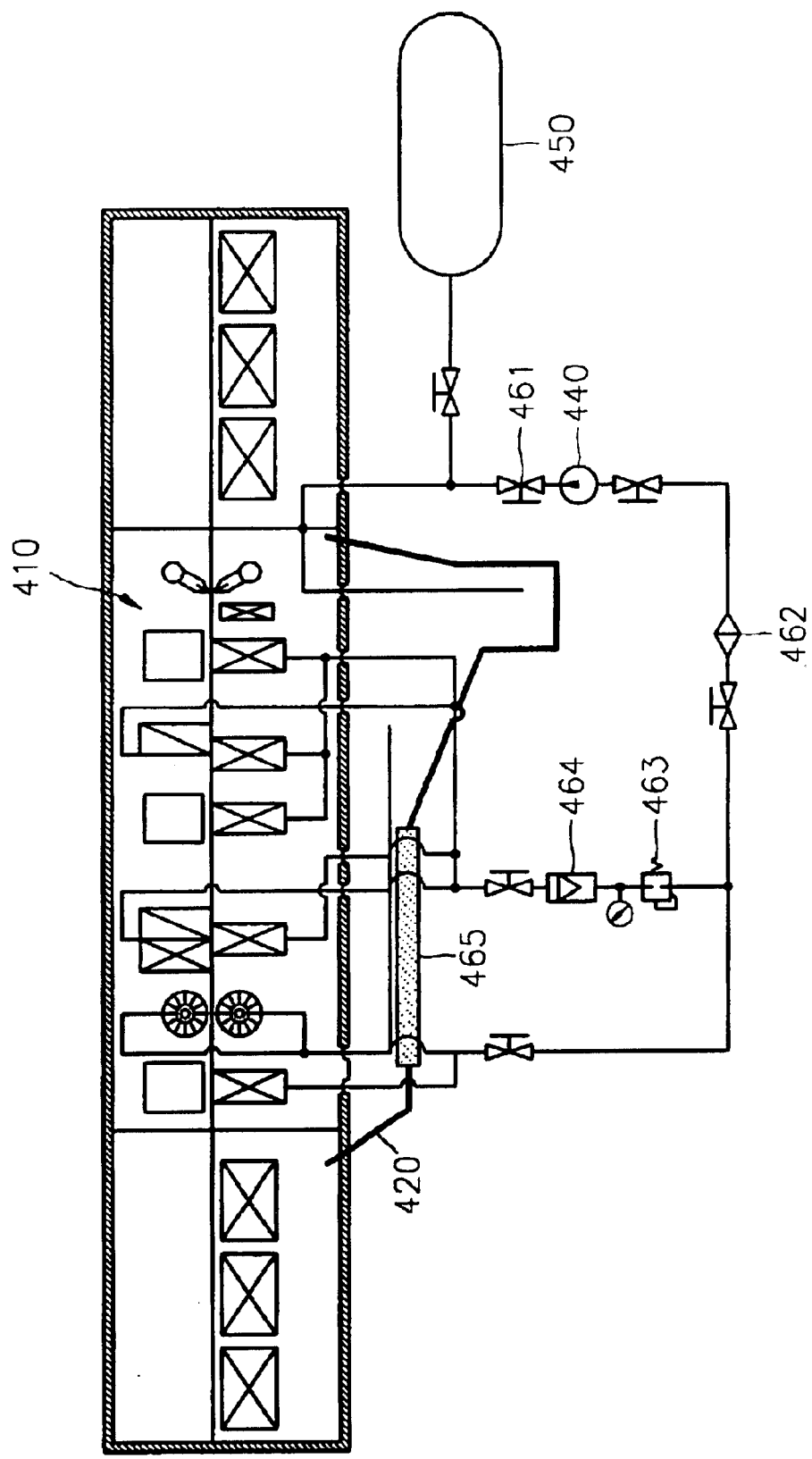
FIG. 4 is a more detailed diagram of the fluid supplying system shown in FIG. 3.

FIG. 3 is a schematic diagram of a fluid-supplying system according to the present invention, and FIG. 4 is a more detailed diagram of the fluid supplying system shown in FIG. 3.

Referring to FIGS. 3 and 4, the fluid supplying system includes a bath united with storage tank 320 or 420 including a process unit 310 or 410, a fluid supplement unit 350 or 450, a pump 340 or 440, and pipelines connecting the foregoing elements.

Figure 2:
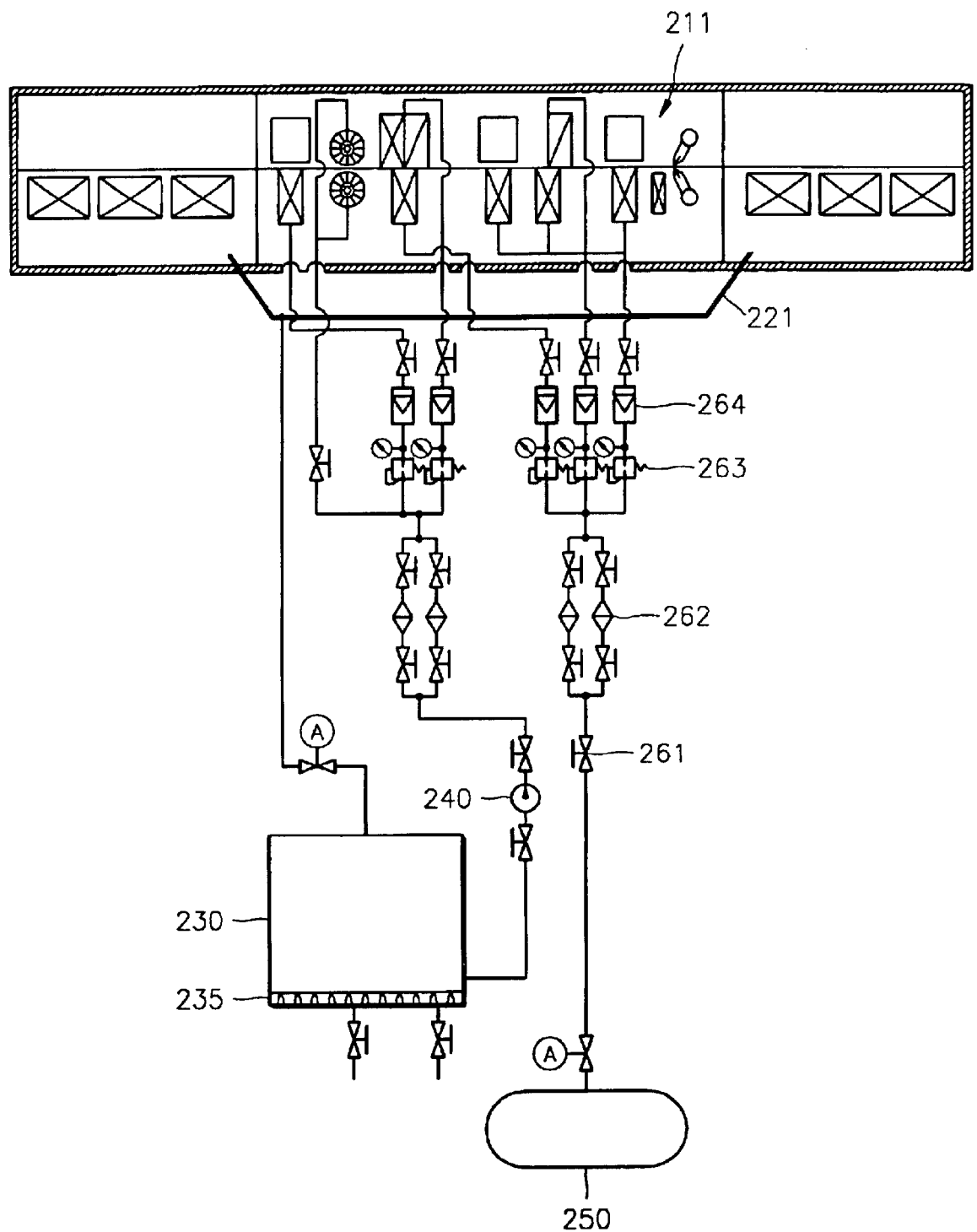
FIG. 2 is a more detailed diagram of the conventional fluid supplying system.

A wet process, such as a cleaning process, for a glass substrate (not shown) is performed in the process unit 310 or 410 included in the bath united with storage tank 320 or 420. The fluid used in the wet process is collected in the bath united with storage tank 320 or 420. The bath according to the invention is characterized in that a fluid storage tank is united with the bath. Since an individual storage tank, i.e., the bath united with storage tank 320 or 420, is provided for each process unit 310 or 410, there is no need to provide a large storage tank as used in a conventional system. Further, while pipelines for connecting a bath and a storage tank have been used in the conventional system, such pipelines are no longer required according to the present invention. That is, comparing FIG. 4 with FIG. 2, it is understood that the structure of the fluid supplying system according to the present invention in FIG. 4 is simpler than that of the conventional system in FIG. 2.

In order to constantly keep the fluid at an optimum temperature, a first heater 465 is provided to the bath united with storage tank 420. The temperature of the bath united with storage tank 420 is determined in consideration of thermal loss during the supply of the fluid.

The process unit 310 or 410 is provided with the fluid collected and stored in the bath united with storage tank 320 or 420 and the fluid supplemented from the fluid supplement unit 350 or 450 via the pump 340 or 440. A second heater (not shown) can be provided in the fluid supplement unit 350 or 450 to keep the supplementary fluid at an optimum process temperature. The pipelines connecting the pump 340 or 440 and the process unit 310 or 410 include valves 461, a filter 462, a regulator 463, and/or a flow meter 464.

As shown in FIGS. 3 and 4, in the fluid supplying system according to the present invention, the distance from the pump 340 or 440 to the process unit 310 or 410 is very short since a bath united with storage tank 320 or 420 is individually provided for each process unit. Since the distance from the pump 340 or 440 to the process unit 310 or 410 is short, the number of connector elements of the pipelines, e.g., filters, valves, elbows, reducers, T's, etc., can be minimized. Accordingly, the loss of pressure due to friction within the pipelines can be minimized. Further, since thermal loss in the pipelines is reduced, costs can be saved.

The amount of fluid supplemented by the fluid supplement unit 450 of cleaning equipment is generally about 0.5 liters per substrate. That is, fluid of about 0.5 liters is adhered to each substrate and discharged, together with each substrate, outwardly. Since the total amount of fluid supplemented by the fluid supplement unit 450 according to the present invention is smaller than the amount of fluid supplemented by a conventional fluid supplement unit, a much higher ratio of the fluid to the entire fluid can be achieved according to the present invention. According to the present invention, since a fairly large amount of clean fluid is continuously re-supplied and mixed with the existing fluid in the equipment, the opacity of the fluid does not increase beyond a certain level despite of the continuation of the processes. Therefore, it is possible to prevent operational errors in the processes and the occurrence of defective LCD devices due to the increase of the opacity of the fluid.

Now, a bath included in the fluid supplying system for LCD manufacturing equipment will be described. The bath described below can be either a conventional independent bath separated from the storage tank or the above-described bath united with storage tank. That is, the body material of the bath is not limited to only those materials used for the bath united with storage tank according to the present invention, but can include the conventional materials used in the body of the conventional bath.

Figure 5:
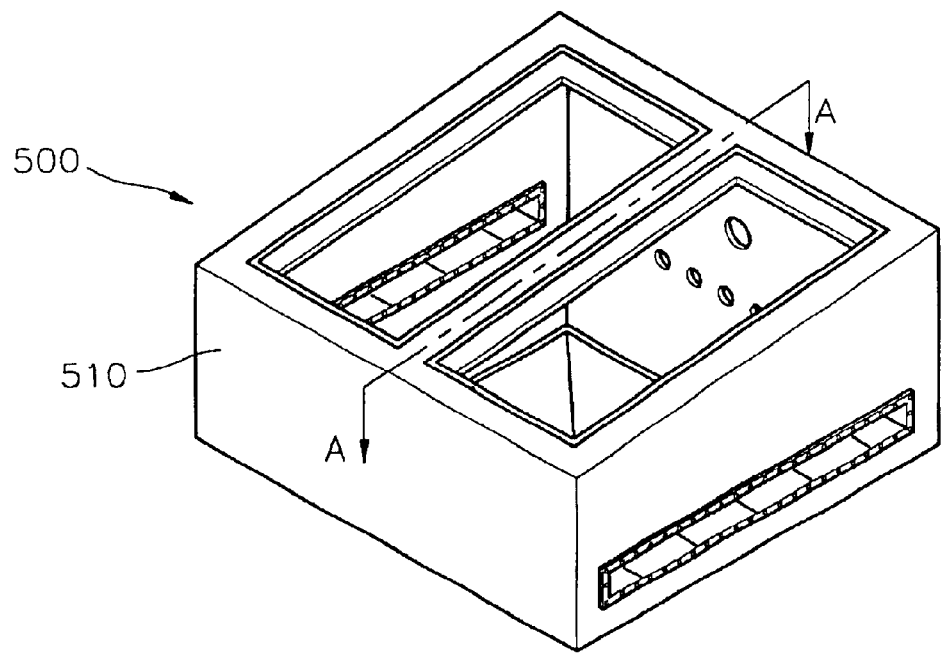
FIG. 5 is a perspective view of a typical bath included in a fluid supplying system for LCD manufacturing equipment.
Figure 6:
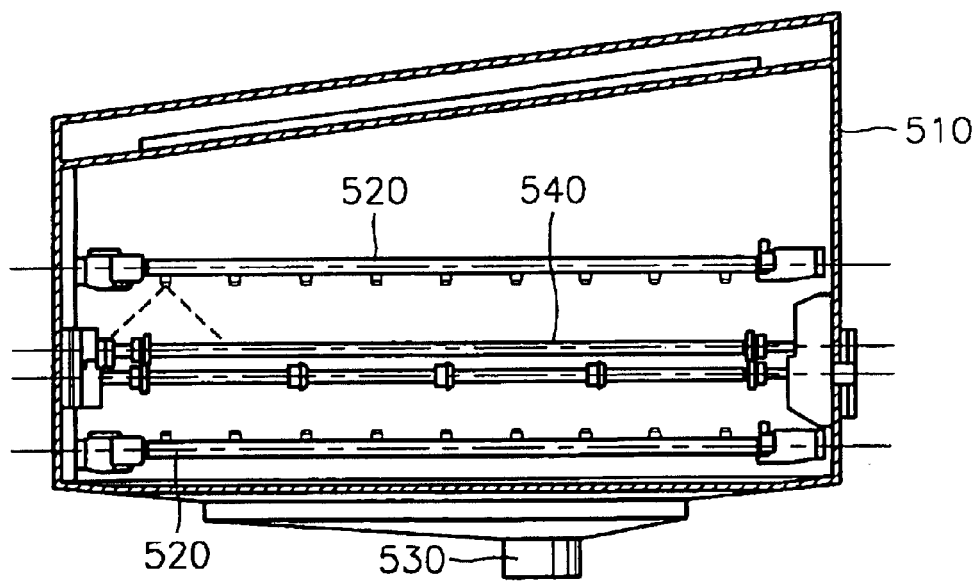
FIG. 6 is a cross-sectional view of the bath shown in FIG. 5.

FIG. 5 is a perspective view of a typical bath included in a fluid supplying system for LCD manufacturing equipment, and FIG. 6 is a cross-sectional view of the bath taken along line A-A' of FIG. 5.

Referring to FIGS. 5 and 6, the bath 500 used in a wet process for manufacturing LCD devices typically includes a body 510, in which glass substrates for fabricating LCD devices are input and are subject to a wet process; a fluid supplying unit 520 mounted within the body 510, which supplies chemical fluid into the body 510; and an outlet 530 through which the chemical fluid used in the process is discharged. If necessary, a loading and conveying means 540 for loading and conveying the glass substrates for fabricating LCD devices can be mounted within the body 510. Except for the body 510, according to the above-described embodiment, the elements of the bath 500, i.e., the fluid supplying unit 520, the loading and conveying means 540, and the outlet 530, form the process unit.

Not only can chemical fluid that is used in the wet process be supplied, but deionized water can be sprayed via the fluid supplying unit 520. Further, the outlet 530 can be connected to a fluid storage tank (not shown) provided outside to collect the used chemical fluid, if necessary. If the bath united with storage tank is used as described above, the used chemical fluid is collected at the bottom of the bath. The glass substrates for fabricating LCD devices are moved into the body 510 via the loading and conveying means 540 and the thin film or photoresist on the surfaces of the glass substrates is cleaned, stripped, developed, or etched by the chemical fluid or the deionized water sprayed via the fluid supplying unit 520.

Figure 7:
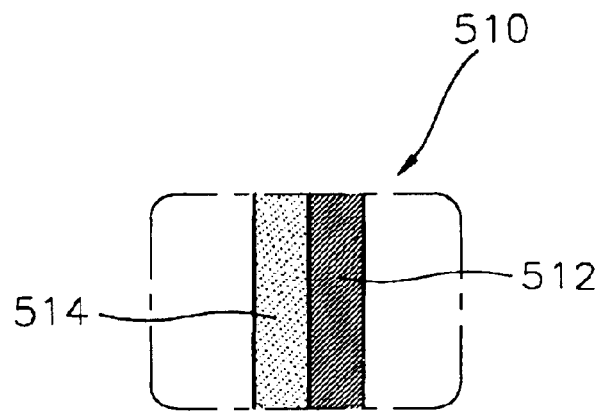
FIG. 7 is a partially enlarged cross-sectional view of the bath included in the fluid supplying system according to an embodiment of the present invention.
Figure 8:
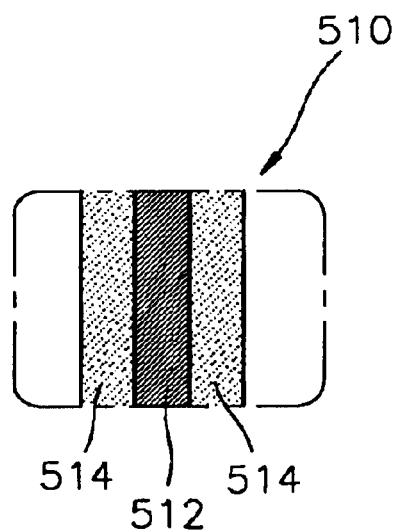
FIG. 8 is a partially enlarged cross-sectional view of the bath included in the fluid supplying system according to another embodiment of the present invention.

FIG. 7 is a partially enlarged cross-sectional view showing materials of the body of the bath included in the fluid supplying system according to an embodiment of the present invention; and FIG. 8 shows a modification thereto.

While the body of the conventional bath has been made of a single durable material, such as steel or PVD, the body of the bath according to the present invention is made of a durable material 512 with a chemically resistive material 514 coated thereon. For example, the chemically resistive material may be a Teflon film. Since the Teflon film is a very high chemical resistive material that does not react with chemical fluid like organic solvent, the Teflon film can be widely used during wet processes regardless of the kind of chemical fluid. Since the body of the bath is made of the durable material 512 together with the chemically resistive material 514, the bath according to the present invention can be compatibly used in any equipment, such as stripping, cleaning, etching, or developing equipment. The durable material 512 may be steel or PVC.

Further, the chemical resistive material 514 can be coated on either only the inner surface of the body of the bath where the chemical fluid contacts or both sides of the durable material 512, as shown in FIG. 8, in consideration of the chemical fluid leaking out or the gases forming from the chemical fluid.

As described above, according to the present invention, since the fluid storage tank is united with the bath for collecting fluid and the storage tank is individually provided to each bath, the size of the storage tank and the length between the storage tank and the process unit can be reduced and, as a result, the arrangements of pipelines can be simplified. Further, the loss of pressure and heat of the process fluid through the pipelines can be reduced and, therefore, costs can be saved. In addition, the fluid can be sufficiently provided even with a small pump. Moreover, since the opacity of the fluid can be maintained at a certain level, there is no need to exchange the entire amount of the fluid after completing certain processes.

Meanwhile, since the body of the bath is coated with a high chemical resistive material, it is possible to prevent the durable material of the body of the bath from reacting with the chemical fluid used for wet processes. Further, the wet processing bath can be compatibly used in any equipment, such as stripping, developing, etching, or cleaning equipment, in which wet processes are performed.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A fluid supplying system for LCD (liquid crystal display) manufacturing equipment, comprising:
   a bath integral with a storage tank including a process unit and/or a fluid storage tank united with the bath;
   a fluid supplement unit supplementing fluid that is adhered to substrates within the process unit and discharged together with the substrates outside of the bath integral with the storage tank;
   a pump supplying fluid stored in the bath integral with the storage tank and the fluid supplemented from the fluid supplement unit; and
   a plurality of pipelines connecting the bath integral with the storage tank, including the process unit, and the fluid supplement unit to the pump.

2. The fluid supplying system according to claim 1, wherein the LCD manufacturing equipment is cleaning, etching, developing, or stripping equipment.

3. The fluid supplying system according to claim 1, wherein the bath integral with the storage tank includes a first heater for heating the fluid.

4. The fluid supplying system according to claim 1, wherein the fluid supplement unit includes a second heater for heating the fluid to be supplemented at a constant temperature.

5. The fluid supplying system according to claim 1, wherein the pipelines connecting the process unit to the pump include filters, valves, regulators, and/or flow meters.

6. A fluid supplying system for LCD (liquid crystal display) manufacturing equipment, comprising:
   a bath integral with a storage tank including a process unit and a fluid storage tank united with the bath;
   a fluid supplement unit supplementing fluid that is adhered to substrates within the process unit and discharged together with the substrates outside of the bath united with storage tank;
   a pump supplying fluid stored in the bath integral with the storage tank and the fluid supplemented from the fluid supplement unit; and
   a plurality of pipelines connecting the bath integral with the storage tank, including the process unit, and the fluid supplement unit to the pump, and
   wherein the bath integral with the storage tank includes a bath body; a process unit included in the bath body, in which a predetermined process is performed; and
   an outlet for discharging fluid within the bath body outside of the bath, and the bath body is made of a durable material and a chemically resistive material is coated on the surface of the durable material.

7. The fluid supplying system according to claim 6, wherein the LCD manufacturing equipment is cleaning, etching, developing, or stripping equipment.

8. The fluid supplying system according to claim 6, wherein the bath integral with the storage tank includes a first heater for heating the fluid.

9. The fluid supplying system according to claim 6, wherein the fluid supplement unit includes a second heater for heating the fluid to be supplemented at a constant temperature.

10. The fluid supplying system according to claim 6, wherein the pipelines connecting the process unit to the pump include filters, valves, regulators, and/or flow meters.

11. The fluid supplying system according to claim 6, wherein the chemically resistive material is Teflon.

12. The fluid supplying system according to claim 6, wherein the chemically resistive material is coated on one side or both sides of the durable material.

* * * * *